(12) United States Patent
Kretzschmar et al.

(10) Patent No.: US 7,431,327 B2
(45) Date of Patent: Oct. 7, 2008

(54) FRONT-PASSENGER AIRBAG MODULE

(75) Inventors: Albrecht Kretzschmar, Niederselters (DE); Wolfgang Kampfmann, Eschau (DE); Stefan Fuchs, Goldbach (DE); Rudiger Boll, Keilberg (DE); Norbert Sahm, Aschaffenburg (DE); Christian Kempe, Aschaffenburg (DE); Thomas Webert, Habichsthal (DE); Volker Porrmann, Aschaffenburg (DE); Maximo Papa, Aschaffenburg (DE); Norbert Muller, Aschaffenburg (DE); Nick Eckert, Berlin (DE); Matthias Liebetrau, Falkensee (DE); Achilleas Leontidis, Aschaffenburg (DE); Ralf Bartholomaus, Glattbach (DE)

(73) Assignee: Takata-Petri AG, Aschaffenburg (DE)

( * ) Notice: Subject to any disclaimer, the term of this patent is extended or adjusted under 35 U.S.C. 154(b) by 283 days.

(21) Appl. No.: 11/200,239

(22) Filed: Aug. 10, 2005

(65) Prior Publication Data
US 2006/0125212 A1    Jun. 15, 2006

(30) Foreign Application Priority Data
Aug. 13, 2004    (DE) .................... 10 2004 040 235

(51) Int. Cl.
*B60R 21/16*    (2006.01)
(52) U.S. Cl. .................. 280/728.2; 280/740; 280/743.1
(58) Field of Classification Search .............. 280/728.2, 280/740, 743.1
See application file for complete search history.

(56) References Cited

U.S. PATENT DOCUMENTS

| | | | | |
|---|---|---|---|---|
| 4,153,273 A | * | 5/1979 | Risko | 280/740 |
| 5,261,692 A | | 11/1993 | Kneip et al. | |
| 5,364,123 A | * | 11/1994 | Abramczyk et al. | 280/728.2 |
| 5,480,182 A | * | 1/1996 | Lauritzen et al. | 280/728.2 |
| 5,509,686 A | * | 4/1996 | Shepherd et al. | 280/738 |
| 5,582,423 A | * | 12/1996 | Rion et al. | 280/728.2 |
| 5,704,634 A | | 1/1998 | Wallner et al. | |
| 5,836,608 A | * | 11/1998 | Soderquist et al. | 280/728.2 |
| 5,857,696 A | * | 1/1999 | Inoue et al. | 280/728.2 |
| 5,899,485 A | * | 5/1999 | Folsom et al. | 280/728.2 |
| 5,918,898 A | * | 7/1999 | Wallner et al. | 280/728.2 |
| 5,941,556 A | | 8/1999 | Rose | |
| 5,988,677 A | * | 11/1999 | Adomeit et al. | 280/740 |
| 6,056,313 A | * | 5/2000 | Lutz et al. | 280/728.1 |
| 6,092,833 A | * | 7/2000 | Nariyasu | 280/728.2 |
| 6,149,192 A | * | 11/2000 | Swann et al. | 280/740 |
| 6,161,862 A | * | 12/2000 | Rose et al. | 280/728.2 |
| 6,173,988 B1 | | 1/2001 | Igawa | |
| 6,364,342 B1 | * | 4/2002 | Kim | 280/728.2 |

(Continued)

FOREIGN PATENT DOCUMENTS

DE    195 05 507 A1    8/1996

(Continued)

*Primary Examiner*—Christopher Ellis
*Assistant Examiner*—Jacob Meyer
(74) *Attorney, Agent, or Firm*—Foley & Lardner LLP

(57) ABSTRACT

A front-passenger airbag module includes a gas generator, a diffuser, a self-supporting airbag, and an airbag housing. To reduce the development costs of a new airbag system, a component system that includes the airbag, the diffuser, the gas generator, and an arched airbag holder, which is arranged between the airbag housing and the gas generator and which is at least partially enclosed by the lower section of the self-supporting airbag.

13 Claims, 5 Drawing Sheets

U.S. PATENT DOCUMENTS

| | | | |
|---|---|---|---|
| 6,394,486 B1* | 5/2002 | Fujimura et al. | 280/728.2 |
| 6,406,056 B2 | 6/2002 | Yokota | |
| 6,467,805 B1* | 10/2002 | Schnowitz et al. | 280/740 |
| 6,485,052 B2* | 11/2002 | Specht | 280/736 |
| 6,565,114 B1* | 5/2003 | Thomas | 280/728.2 |
| 6,682,093 B2* | 1/2004 | Tajima et al. | 280/732 |
| 6,802,526 B2* | 10/2004 | Dumbrique et al. | 280/728.2 |
| 7,370,884 B2* | 5/2008 | Clark et al. | 280/740 |
| 2002/0050701 A1* | 5/2002 | Amamori | 280/728.2 |
| 2002/0067028 A1* | 6/2002 | Ostermann et al. | 280/728.2 |
| 2002/0149185 A1* | 10/2002 | Lutz et al. | 280/740 |
| 2003/0137133 A1* | 7/2003 | Yamaji et al. | 280/740 |
| 2004/0012181 A1* | 1/2004 | Kim et al. | 280/740 |
| 2004/0100071 A1* | 5/2004 | Chavez et al. | 280/728.2 |
| 2005/0082793 A1* | 4/2005 | Lee | 280/740 |
| 2005/0110244 A1* | 5/2005 | Wheelwright et al. | 280/728.2 |
| 2005/0156419 A1* | 7/2005 | Gabler et al. | 280/740 |
| 2005/0218630 A1* | 10/2005 | Tata et al. | 280/728.2 |
| 2005/0225058 A1* | 10/2005 | Braun | 280/728.2 |
| 2006/0103124 A1 | 5/2006 | Marotzke | |
| 2006/0157961 A1* | 7/2006 | Burns | 280/736 |
| 2007/0046006 A1* | 3/2007 | Katsuda et al. | 280/740 |
| 2007/0176398 A1* | 8/2007 | Vigeant et al. | 280/728.2 |
| 2007/0200327 A1* | 8/2007 | Kloss et al. | 280/740 |

FOREIGN PATENT DOCUMENTS

| | | |
|---|---|---|
| DE | 101 10 654 A1 | 2/2002 |
| DE | 102 16 217 A1 | 10/2003 |
| DE | 203 10 575 U1 | 11/2003 |
| EP | 0 538 607 A1 | 4/1993 |
| EP | 0 633 168 A1 | 1/1995 |
| EP | 0 790 154 A1 | 8/1997 |
| JP | 2001-39252 | 2/2001 |
| JP | 2002-211340 | 7/2002 |
| WO | WO 03/045739 A1 | 6/2003 |
| WO | WO 2004/018267 A1 | 3/2004 |

* cited by examiner

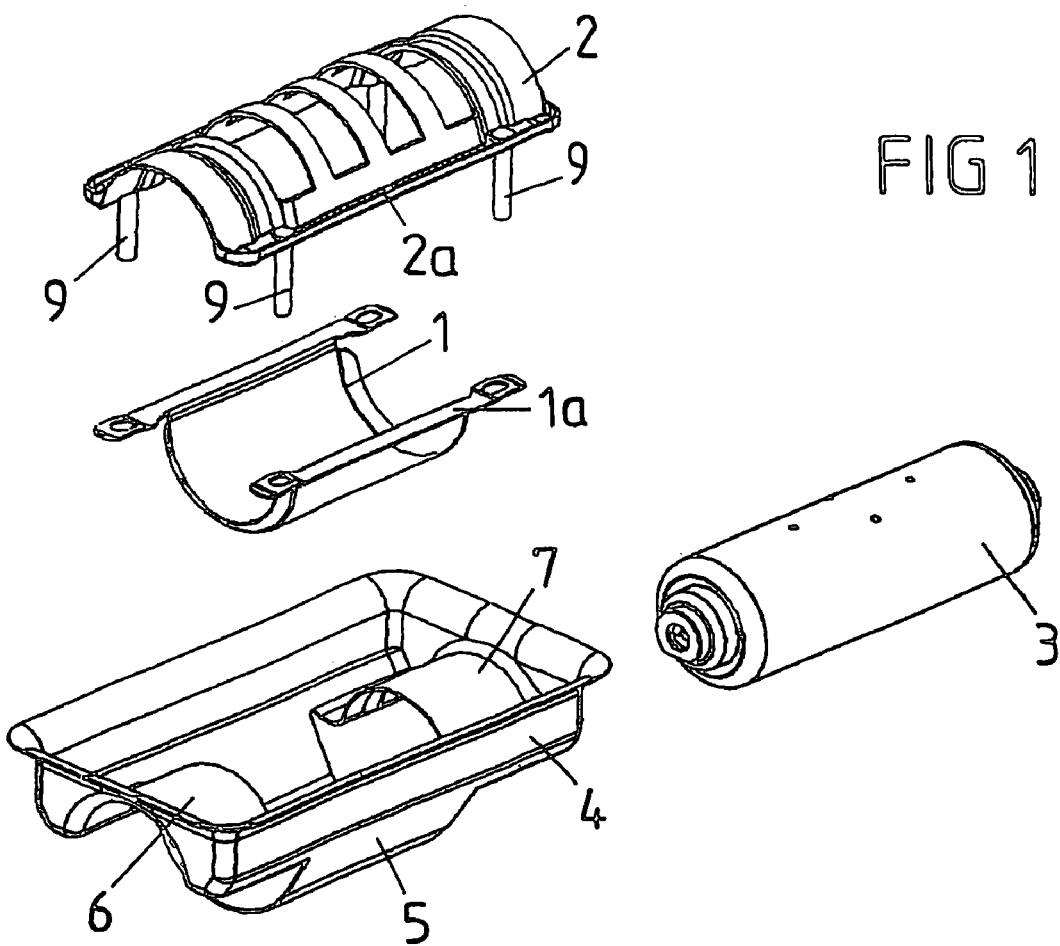
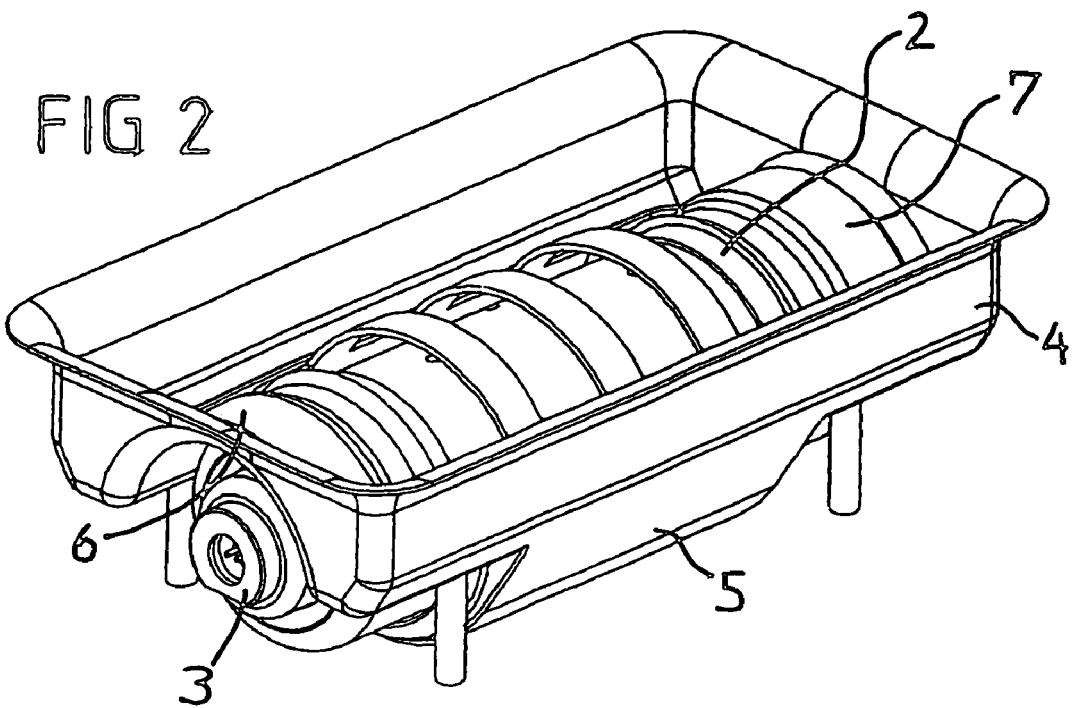

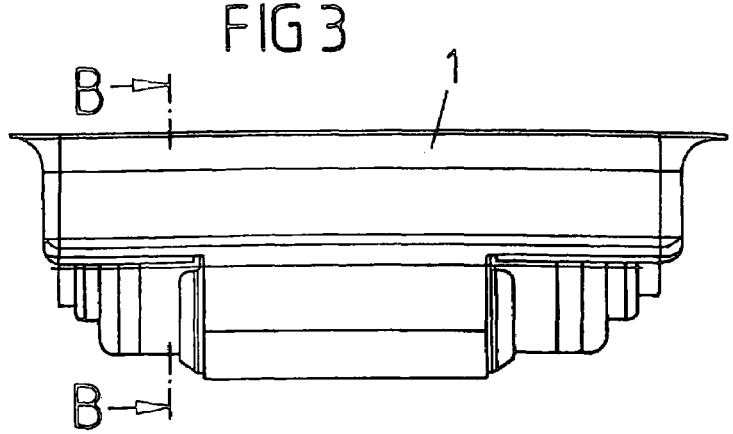
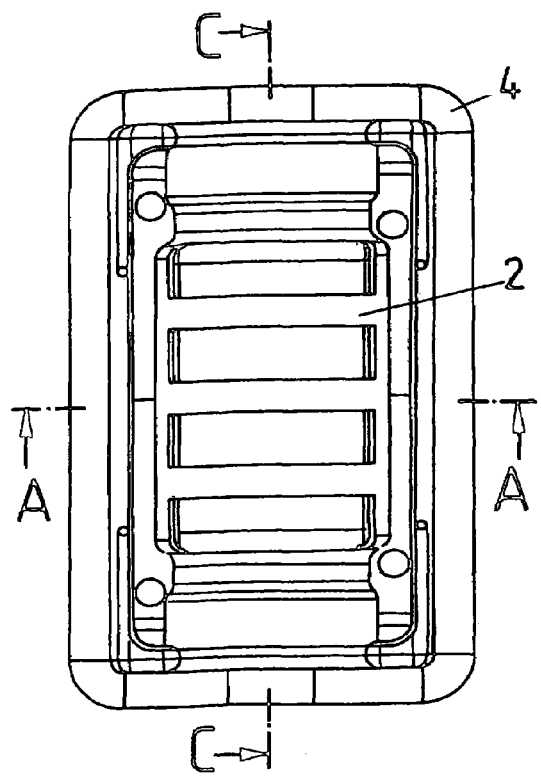
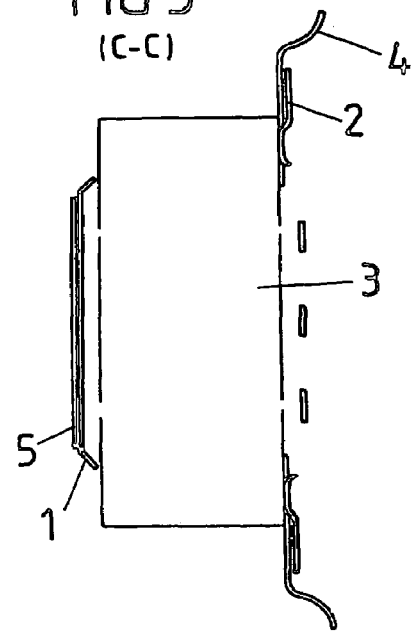
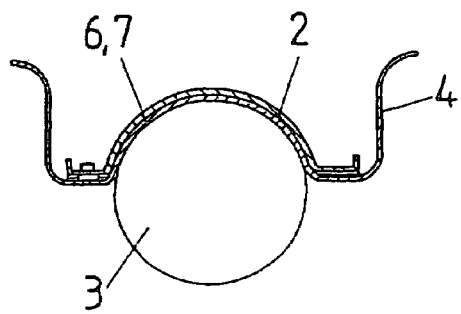
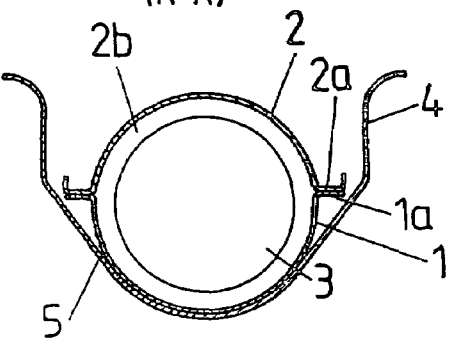

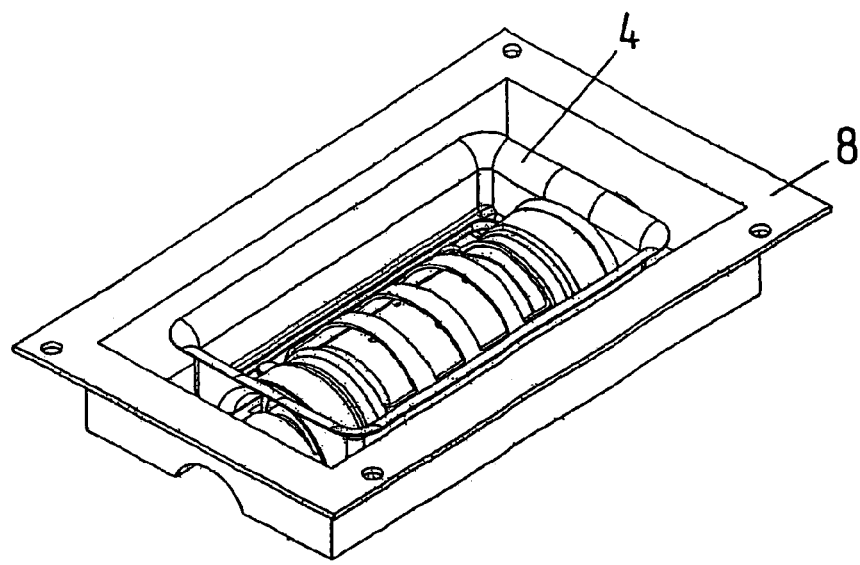
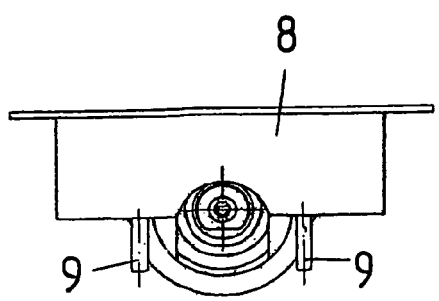
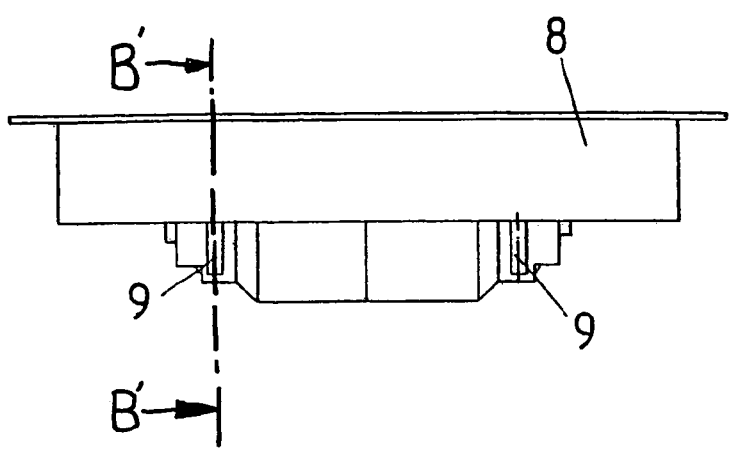

FIG 11
FIG 12
(C'-C')
FIG 13
(B'-B')
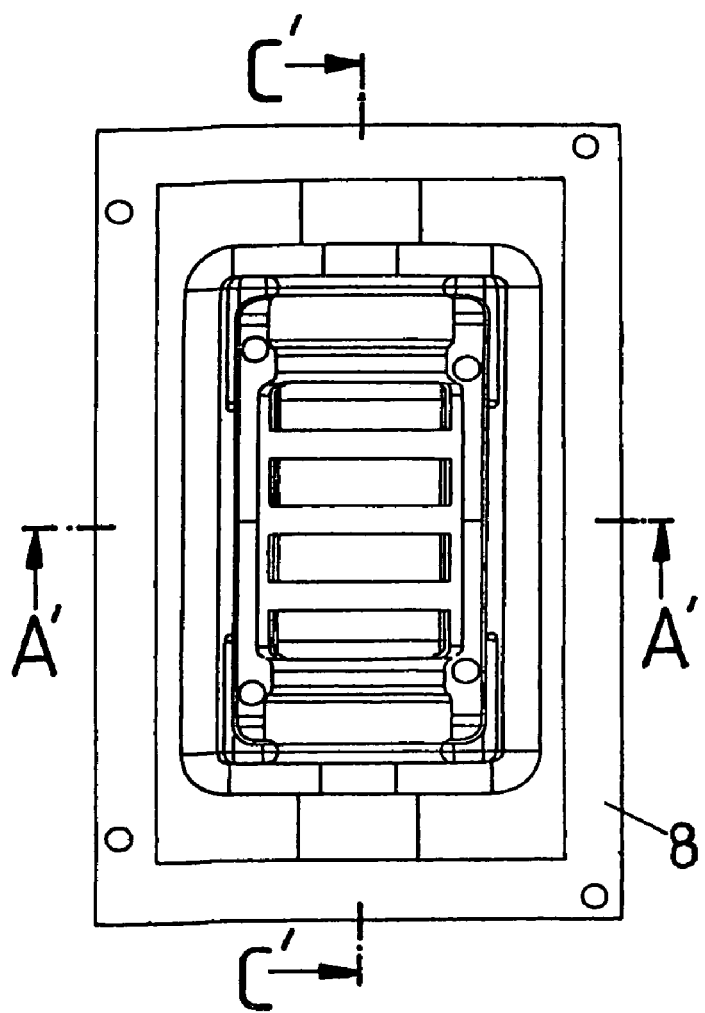
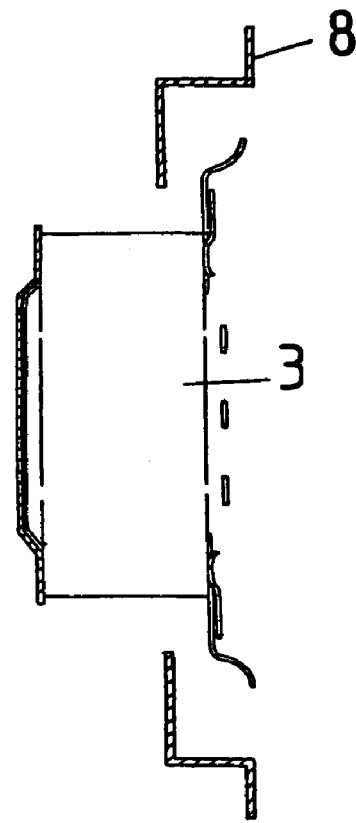
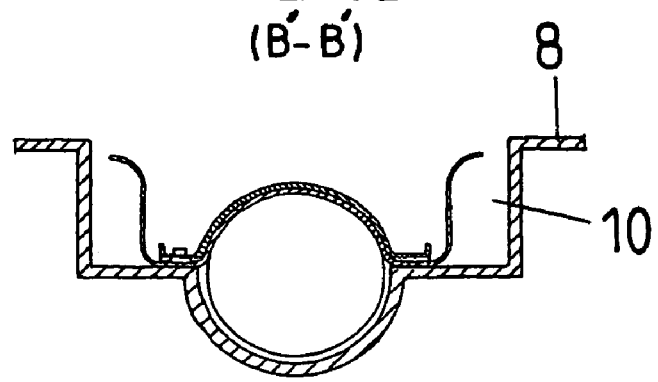

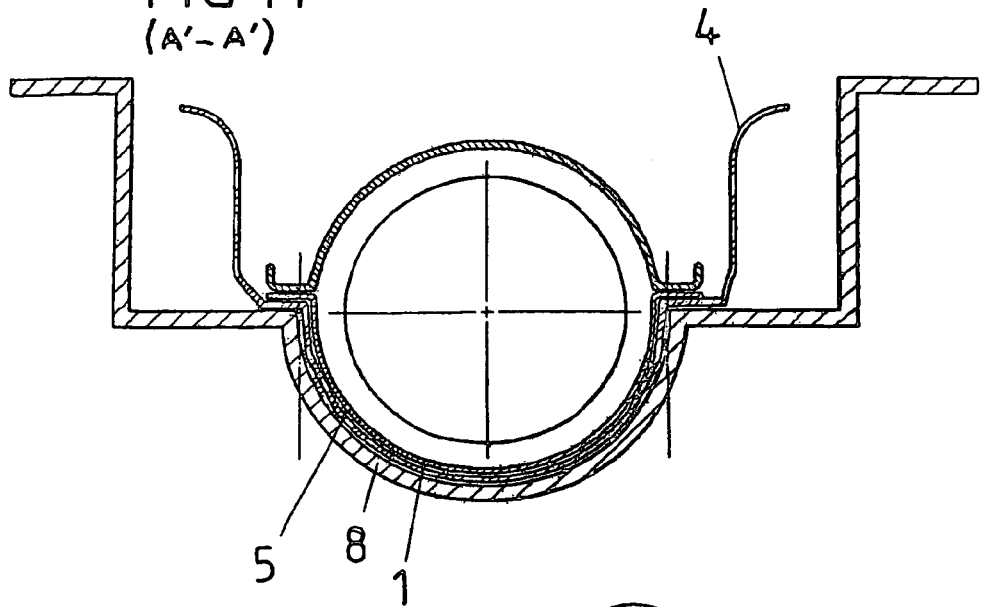
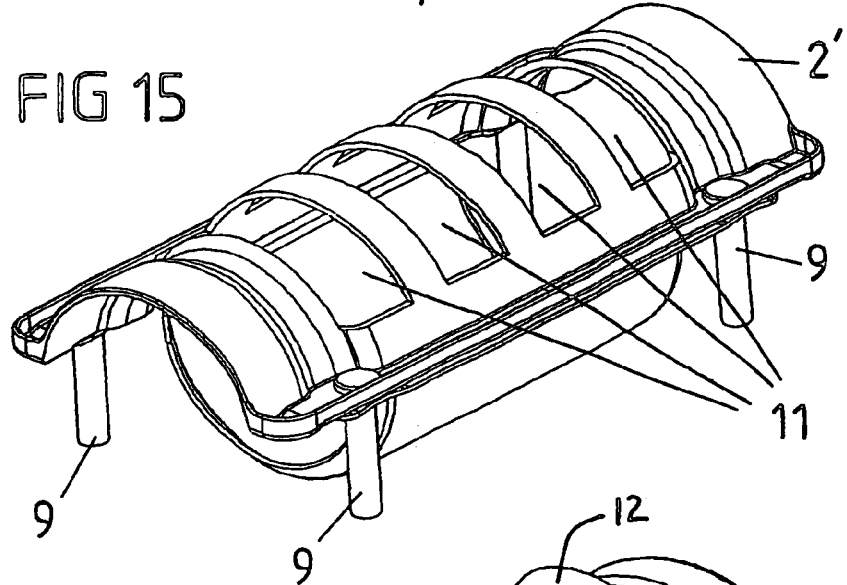
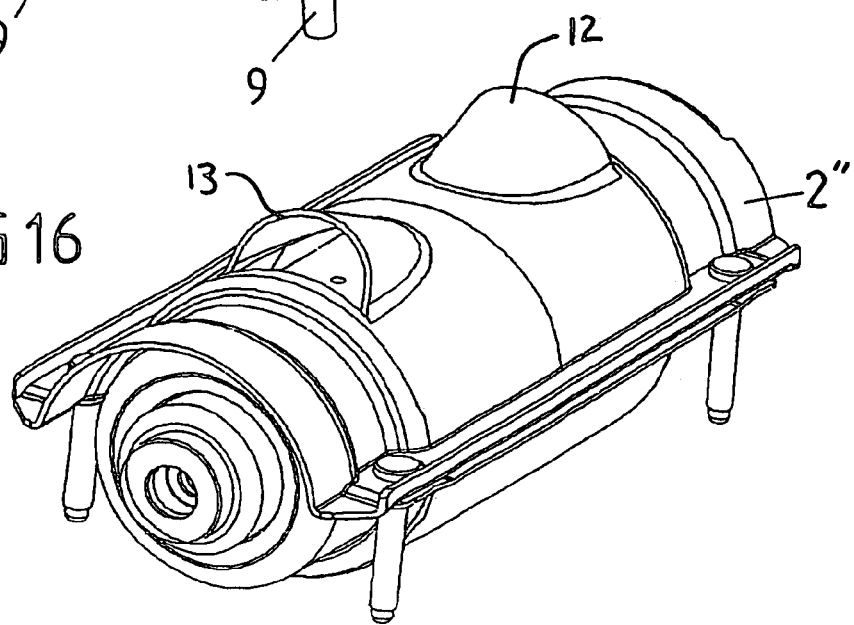

FRONT-PASSENGER AIRBAG MODULE

BACKGROUND

The present invention relates to a front-passenger airbag module. In particular, the present invention relates to a front-passenger airbag module having a gas generator, a diffuser, a self-supporting airbag, and an airbag housing.

In the development of a new motor vehicle, airbag modules are likewise newly developed so that they can be optimally adapted to the particular vehicle structure. As a result, each new vehicle requires a new airbag, diffuser, and airbag housing to be developed, thereby resulting in high component production and quality assurance costs.

Self-supporting airbag designs, which reduce development costs, are disclosed, for example, in DE 195 05 507 C2 (incorporated by reference herein), which introduces a tubular gas generator into the lower section of the airbag. The airbag of DE 195 05 507 C2 partially encloses the gas generator and is, therefore, held without any additional means of fastening; in the development of new airbag systems, the lack of additional means of fastening facilitates the development of the airbag fastening. Even in light of this advancement, however, the development costs remain undesirably high.

Accordingly, the present invention has been made in light of the aforementioned problem. Specifically, an object of the present invention is to further reduce the development costs of a new airbag system.

SUMMARY

An embodiment a front-passenger airbag module that includes, among other possible things: (a) a component system that includes, among other possible things: (i) a gas generator; (ii) a diffuser; (iii) a self-supporting airbag; and (iv) an arched airbag holder; and (b) an airbag housing. At least a portion of airbag holder is arranged between the airbag housing and the gas generator.

Further, at least a portion of the airbag holder is enclosed by a lower section of the self-supporting airbag.

In a further embodiment of the airbag module, a diffuser chamber may be provided between the diffuser and the arched airbag holder.

In another further embodiment of the airbag module, the diffuser may be arched shaped.

In another further embodiment of the airbag module, the diffuser and the airbag holder may take the form of cylindrical half-shells. In addition, the half-shells may have flange-like edges that rest on one another in the assembled state.

In another further embodiment of the airbag module, the gas generator may be tubular. In addition, the airbag holder and the diffuser may be open on at least one end for the introduction of the tubular gas generator.

In another further embodiment of the airbag module, in an area outside the airbag holder, the airbag may be situated between the diffuser and the gas generator.

In another further embodiment of the airbag module, the module may additionally include fastening elements that fasten the component system to the airbag housing.

In another further embodiment of the airbag module, the fastening elements may depend from the diffuser and may extend through the airbag housing.

In another further embodiment of the airbag module, the module may additionally include fastening elements that fasten the diffuser to the airbag housing. Moreover, the fastening elements may be threaded bolts.

In another further embodiment, the threaded bolts may depend from the diffuser and may extend through the airbag housing.

In another further embodiment of the airbag module, the diffuser may have openings that are configured to serve as gas outlets.

In another further embodiment of the airbag module, the diffuser may have one or more flared scoops that are configured to serve as gas outlets and/or gas ducts.

The aforementioned component system of the airbag module can be fitted into different airbag housings, which are designed to match newly developed motor vehicles. By varying the size of the airbag housing, the component system can also be readily adapted to different airbag sizes. In particular, the use of a separate airbag holder keeps the hot gas emerging from the gas generator away from the airbag housing, so that the latter may be composed of various materials (e.g., magnesium alloys or plastics) that are otherwise incapable of withstanding generally high temperatures.

Another advantage of the aforementioned component system is that both two-dimensional and three-dimensional airbags can be used.

The diffuser is in particular designed so that there is a diffuser chamber between it and the arched airbag holder. The diffuser may be of arched shape and, in one embodiment, the diffuser and the airbag holder take the form of cylindrical half-shells. These have flange-like edges, which rest on one another in the assembled state. In this embodiment, the airbag holder and the diffuser may be open on at least one end thereof for the introduction of a tubular gas generator, thereby making it readily possible to position the gas generator in the airbag once the airbag holder and the diffuser have been introduced into the airbag.

In the area outside the airbag holder, the airbag may be suitably situated between the diffuser and the gas generator, when viewed in the direction of the longitudinal axis of the gas generator. In this way, additional fixing may be provided for the airbag.

The outlet flow geometry can be readily modified in the diffuser according to the requirements of the application, without making major modifications to the overall system. For example, the diffuser may have openings that serve as gas outlets and/or flared scoops that serve as gas outlets and/or gas ducts.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is an exploded perspective view of an embodiment of a component system, which includes a first embodiment of a diffuser, according to the present invention;

FIG. 2 is an assembled perspective view of the component system of FIG. 1

FIGS. 3 and 4 are side and top views, respectively, of the component system of FIG. 1;

FIG. 5 is a cross-sectional view of the component system of FIG. 1 taken along line C-C in FIG. 4;

FIG. 6 is a cross-sectional view of the component system of FIG. 1 taken along line B-B in FIG. 3;

FIG. 7 is a cross-sectional view of the component system of FIG. 1 taken along line A-A in FIG. 4;

FIG. 8 is a perspective view of the component system of FIG. 1 with an airbag housing;

FIGS. 9 and 10 are front and side views, respectively, of the component system and the airbag housing of FIG. 8;

FIG. 11 is a top view of the component system and the airbag housing of FIG. 8;

FIG. 12 is a cross-sectional view of the component system and airbag housing of FIG. 8 taken along line section C'-C' in FIG. 11;

FIG. 13 is a cross-sectional view of the component system and airbag housing of FIG. 8 taken along line section B'-B' in FIG. 10;

FIG. 14 is a large scale, cross-sectional view of the component system and airbag housing of FIG. 8 taken along line section A'-A' in FIG. 11; and FIGS. 15 and 16 are perspective views of second and third embodiments, respectively, of diffusers according to the present invention.

DETAILED DESCRIPTION

Embodiments of the present invention will be described with reference to the drawings. Like numbers are used throughout the drawings to refer to the same or similar parts and in each of the embodiments of the invention hereafter described.

FIG. 1 shows the components of the system according to the invention. This system includes an arched airbag holder 1, a diffuser 2, a tubular gas generator 3 and a self-supporting airbag 4, of which only a mouth area of the airbag is shown. The arched airbag holder 1 and the diffuser 2 are essentially cylindrical half-shells. Moreover, the half-shells of the arched airbag holder 1 and the diffuser 2 have flange-like edges 1a, 2a, respectively, that rest on one another in the assembled state.

The airbag 4 has a loop 5 in the region of the airbag holder 1. Outside this area, viewed in the direction of the longitudinal axis of the gas generator 3, the airbag 4 has upwardly arched sections 6, 7. The components 1, 2, 3, 4, are readily assembled, as shown in FIG. 2. For this purpose the airbag holder 1 and the diffuser 2 are first placed one on top of the other outside the airbag 4, so that the flange-like edges 1a, 2a rest on one another. This sub-assembly is introduced into the loop 5 of the airbag 4. The tubular gas generator 3 is then axially introduced into the diffuser chamber 2b formed between the airbag holder 1 and the diffuser 2 (FIG. 7).

Ends of the gas generator 3 adjacent undersides of the arched portions 6, 7 of the airbag 4 whereas the loop portion 5 of the airbag 4 is separated from the gas generator 3 by the airbag holder 1. In other words, in the area of the airbag holder 1, the loop 5 of the airbag 4 encloses the airbag holder 1. Moreover, as fasteners 9, which depend from the diffuser 2, pass through the airbag holder 1 and the airbag 4, the airbag 4 is a fixed part of the component system, as shown in FIGS. 3 and 5-7. In the area outside the airbag holder 1, the arched sections 6, 7 of the airbag 4 lie between the diffuser 2 and the tubular gas generator 3, thereby additionally fixing the airbag 4, as can be seen from FIG. 6.

To fix the component system in an airbag housing 8, in the embodiment represented in the figures, threaded bolts 9 are provided on the diffuser 2. As can be seen from FIGS. 8 to 13, the system can be adjusted to different airbag sizes by varying the size of the airbag housing 8, for example by varying the length and/or width thereof. That is to say, a different-sized storage space 10 for the airbag 4 can be obtained, without having to modify the other components of the component system.

The support of the loop 5 of the airbag 4 in the area of the airbag holder 1 can again be seen from FIG. 14. As the holder 1 may be composed of sheet metal, the airbag housing 8 in this region may be protected from damage by gas escaping from the tubular gas generator 3, thereby reducing the thermal and mechanical stresses acting on the airbag housing 8. The airbag housing 8 can, therefore, be made from materials (e.g., magnesium alloys or plastics) that are otherwise incapable of withstanding generally high temperatures. The self-supporting attachment of the airbag 4 by means of the loop 5 enables the region in which the component system is attached to the airbag housing 8 (i.e., the structure to which the component system transmits force when the airbag 4 is deployed by the gas generator 3) to be of smaller size as compared to that which is disclosed in DE 195 05 507 C2. As a result, the small attachment region facilitates using the component system with various airbag housings to create airbag modules of varying sizes, which may be readily used in new vehicles.

FIGS. 15 and 16 show different embodiments of the outlet flow geometry of the diffuser 2. The diffuser 2' in FIG. 15 has simple openings 11 for the gases to escape. In FIG. 16, the diffuser 2" has flared scoops 12, 13 that serve as gas outlets and/or gas ducts. The difference in outlet flow geometry has no influence on the dimensions of the components system. As a result, the systems using the diffusers 2', 2" of FIGS. 15 and 16 enjoy the same advantages (e.g., reducing development costs and time by creating a component system capable of being used with various airbag housings, enhancing quality, improving the safety potential in the use of the airbag, etc.) afforded to the system having the diffuser 2 of FIGS. 1-14.

The priority application, German Application No. 10 2004 040 235.3-4, which was filed on Aug. 13, 2004, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention. The scope of the present invention is to be defined as set forth in the following claims.

What is claimed is:

1. A front-passenger airbag module comprising:
   a gas generator;
   a diffuser;
   a self-supporting airbag that includes a loop positioned in a downward direction of the airbag and upwardly arched sections;
   an arched airbag holder; and
   an airbag housing,
   wherein at least a portion of the airbag holder is arranged between the airbag housing and the gas generator, and wherein at least a portion of the airbag holder is enclosed by the loop of the airbag,
   wherein the upwardly arched sections of the airbag are positioned between the diffuser and the gas generator, and
   wherein the arched airbag holder is positioned between the gas generator and the loop of the airbag.

2. The front-passenger airbag module as claimed in claim 1, wherein a diffuser chamber is provided between the diffuser and the arched airbag holder.

3. The front-passenger airbag module as claimed in claim 1, wherein the diffuser is arched shaped.

4. The front-passenger airbag module as claimed in claim 3, wherein the diffuser and the airbag holder take the form of cylindrical half-shells, and wherein the half-shells have flange-like edges that rest on one another in the assembled state.

5. The front-passenger airbag module as claimed in claim 1, wherein the gas generator is tubular, and wherein the airbag holder and the diffuser are open on at least one end for the introduction of the tubular gas generator.

6. The front-passenger airbag module as claimed claim 1, wherein the loop is positioned at a middle portion of the gas generator, wherein the upwardly arched sections are positioned at ends of the gas generator.

7. The front-passenger airbag module as claimed in claim 1, further comprising:
fastening elements that fasten the component system to the airbag housing.

8. The front-passenger airbag module as claimed in claim 7, wherein the fastening elements depend from the diffuser and extend through the airbag housing.

9. The front-passenger airbag module as claimed in claim 1, further comprising:
fastening elements that fasten the diffuser to the airbag housing,
wherein the fastening elements are threaded bolts.

10. The front-passenger airbag module as claimed in claim 9, wherein the threaded bolts depend from the diffuser and extend through the airbag housing.

11. The front-passenger airbag module as claimed in claim 1, wherein the diffuser has openings that are configured to serve as gas outlets.

12. The front-passenger airbag module as claimed in claim 1, wherein the diffuser has one or more flared scoops that are configured to serve as gas outlets or gas ducts.

13. The front-passenger airbag module as claimed claim 6, wherein the upwardly arched sections of the airbag are positioned outside an area covered by the arched airbag holder.

* * * * *